United States Patent

Thögersen et al.

[11] Patent Number: 5,979,917
[45] Date of Patent: Nov. 9, 1999

[54] CATERING CART WITH BRAKING DEVICE

[75] Inventors: Lars Höjgaard Thögersen, Köpenhamn; Nils Toft, Naerum, both of Denmark

[73] Assignee: Scandinavian Airline Systems, Stockholm, Sweden

[21] Appl. No.: 08/973,854

[22] PCT Filed: Apr. 24, 1997

[86] PCT No.: PCT/SE97/00687

§ 371 Date: Feb. 19, 1998

§ 102(e) Date: Feb. 19, 1998

[87] PCT Pub. No.: WO97/39652

PCT Pub. Date: Oct. 30, 1997

[30] Foreign Application Priority Data

Apr. 25, 1996 [SE] Sweden .................................. 9601578

[51] Int. Cl.[6] ........................................................ B62B 3/00
[52] U.S. Cl. .................................... 280/47.34; 280/47.35; 280/79.3; 188/19
[58] Field of Search .............................. 280/47.34, 47.35, 280/79.11, 79.2, 79.3, 657, 33.994, 47.26, 47.24, 47.19, 47.131, 47.18; 188/19, 21, 20

[56] References Cited

U.S. PATENT DOCUMENTS

| | | | |
|---|---|---|---|
| 3,861,702 | 1/1975 | Wilson | 280/79.3 |
| 4,697,711 | 10/1987 | Noren | 280/79.3 |
| 4,875,696 | 10/1989 | Welch et al. | 280/79.3 |
| 4,948,154 | 8/1990 | Guggenhein | 280/79.3 |
| 5,482,299 | 1/1996 | Maddox | 280/79.3 |
| 5,566,961 | 10/1996 | Snell et al. | 280/79.3 |

Primary Examiner—Richard M. Camby
Attorney, Agent, or Firm—John Lezdey & Assoc.

[57] ABSTRACT

A catering cart that includes a brake arrangement and has a height which is substantially greater than its width and length, particularly a catering cart for use in confined spaces, such as the aisles of passenger aircraft and railway diners, wherein the cart is adapted for connection to another similar cart and is provided with four wheels, of which at least two can be locked with the aid of a toothed rack that can be swung into engagement with a toothed wheel fixedly mounted on a respective wheel and which is maneuverable with the aid of a pedal located on the serving side of the cart, through the medium of a brake rod. The catering cart is characterized by at least one coupling element mounted on the side of the cart opposite to the serving side thereof, wherein the coupling element is rotatable in a vertical plane and includes an outwardly directed cam and a groove, an operating rod carrying the coupling element and connected to the pedal, and wherein the operating rod, and therewith the coupling element, is rotated through about 90° when actuating the cart braking arrangement.

6 Claims, 6 Drawing Sheets

CATERING CART WITH BRAKING DEVICE

BACKGROUND OF THE INVENTION

1. Field of the Invention

The present invention relates to a service cart or trolley and then particularly to a catering cart or trolley for use in confined spaces such as the aisles of passenger aircraft and railway diners, wherein the cart is adapted for connection to another similar cart and is provided with four wheels, of which at least two can be locked with the aid of a toothed rack which can be swung into engagement with a toothed wheel fixedly mounted on a respective wheel and which is maneuverable with the aid of a pedal located on the serving side of the cart, through the medium of a brake rod.

2. Description of the Prior Art

The catering carts of the kind intended here can be attended to from two opposite directions and are normally designed to carry food trays placed from the bottom of the trolley and upwards, although the carts may alternatively be designed for other purposes. The known catering carts, however, are encumbered with certain drawbacks. For instance, because they shall be attended from both ends of the cart they have a length which corresponds to twice the length of a food tray. Another drawback is that the personnel in attendance are forced to bend or squat in order to reach trays located at the bottom of the trolley. This is an uncomfortable task and is liable to result in bodily wear and tear in the passage of time. Even when the cart is loaded from only one side, i.e. does not require the presence of two attendants, it is still necessary to attend to the cart as a whole, for instance in an aircraft. Such handling involves unnecessarily tiresome work on the part of the personnel involved. Applicant's parallel Patent Application 9601579-7 relates to a catering cart construction which enables two such carts to be mutually coupled to provide a cart of "twice the length".

SUMMARY OF THE INVENTION

An object of the present invention is to facilitate the work of personnel attending to a cart of this kind, and particularly to enable two mutually coupled carts to be attended from only one side thereof, and also to enable the mutually coupled carts to be braked effectively. This is achieved with an inventive catering cart having the characteristic features set forth in the following Claims.

BRIEF DESCRIPTION OF THE DRAWINGS

The invention will now be described in more detail with reference to an exemplifying embodiment thereof and also with reference to the accompanying drawings, in which.

DESCRIPTION OF THE PREFERRED EMBODIMENTS

Figure 1:
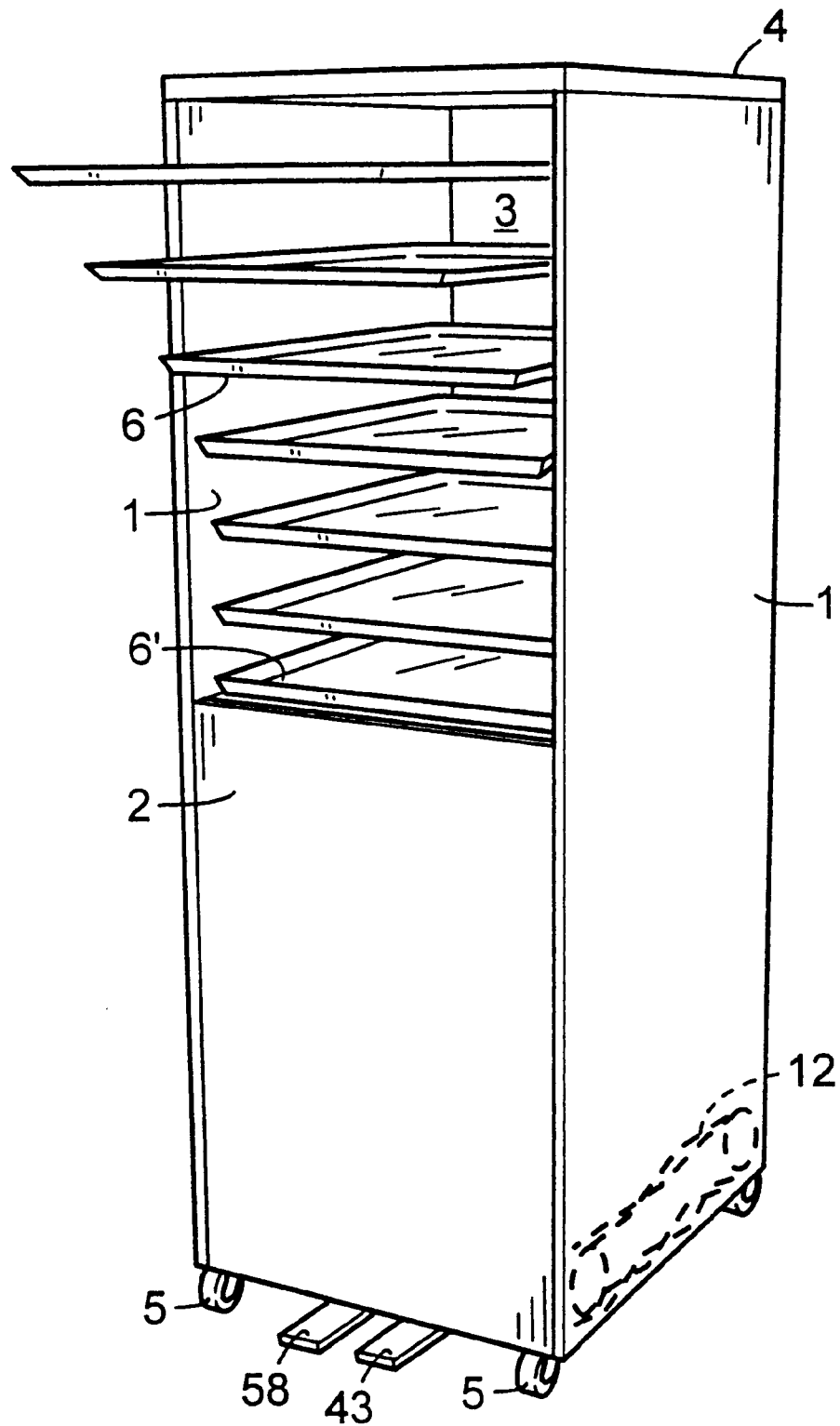
FIG. 1 is a schematic illustration of a catering cart or trolley which is to be coupled to another such cart or trolley in accordance with FIG. 2.

FIG. 1 illustrates schematically an inventive catering cart comprising two sides 1, a front 2, a back 3, and a top 4. The cart is movable on four wheels, of which the rear wheels 5 are casters. The cart interior is accessible from the front 2 of the cart, through an opening in the upper half of said cart, said opening being closable by means of a shutter or flap (not shown in the Figure). The reference numeral 6 identifies trays intended for serving pre-packed meals in aircraft, for instance.

Figure 2:
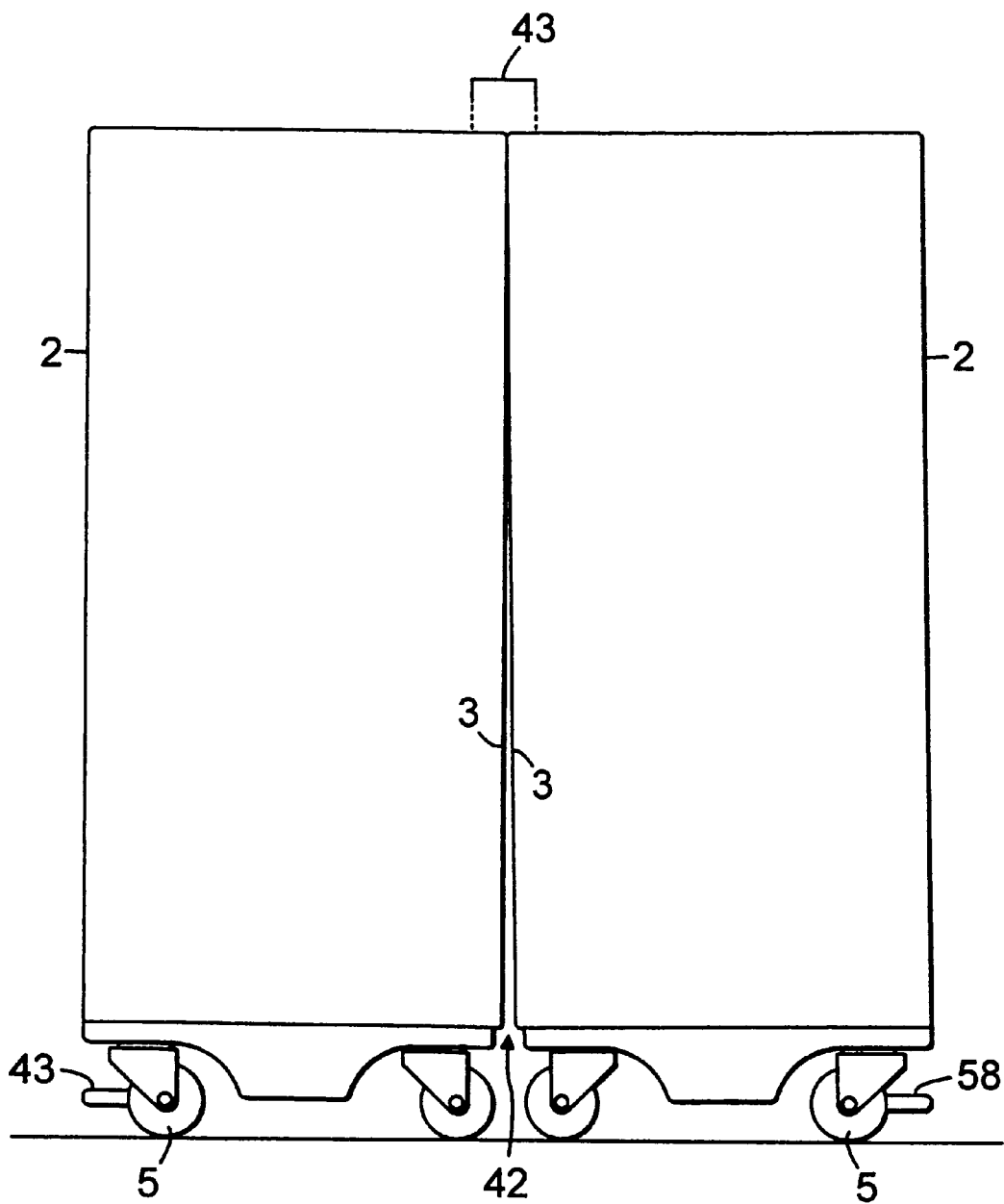

FIG. 2 is a schematic illustration of two catering carts positioned back-to-back in order to be coupled together. When the catering carts are coupled back-to-back there is obtained a catering cart which is accessible from both sides 2 and which can be used for passenger service in the cabin of an aircraft, for instance. This coupling facility enables the easily maneuvered, single catering cart earlier described to be converted to a catering cart of twice the capacity that can be attended to from both sides thereof. The cart coupling means are described in Applicant's parallel Patent Application 9601580-5 and do not form part of the present invention.

As indicated in FIG. 2, when the carts are placed back-to-back they lean against one another such as to leave a gap 42 between the bottom parts of the carts. This gap is obtained by causing the rear sides 3 of the carts to slope, or by providing respective rear sides of the carts with a strip of material such that the two strips will coact to form said gap. The intention in this respect is to lift the mutually adjacent wheels of the cart combination from the underlying surface when coupling the carts together, therewith enabling the catering cart combination to be easily maneuvered. The carts are held together in their upper regions, for instance with the aid of a pair of simple U-shaped fasteners which are inserted down into openings at the top of respective carts. One such U-shaped fastener is referenced 57 in FIG. 2. It will be understood, however, that other forms of fastener means can be used and that the upper fastener means may be constructed so as to be operable by the aforesaid pedal together with the hooks 30.

The inventive catering cart includes a braking arrangement which is adapted so that when the carts are mutually coupled in accordance with the aforegoing, both carts can be braked from one or the other service side of the combined cart with the aid of a brake pedal. This enables the two-cart combination to be maneuvered safely and to be attended by one single person standing on one side of the cart. One embodiment of a cart braking device is illustrated schematically in FIG. 3, said Figure indicating the bottom part 24 but not showing the rear pair of wheels. A pedal 43 has two legs which are angled in relation to one another (see the schematic side view at the bottom of FIG. 3) and is pivotally mounted on the cart by means of a pivot shaft 44. The end of the upwardly extending leg is pivotally connected to an axially rotatable or twistable brake rod 47 by means of a link in a known manner, said rod carrying a locking finger 48 at respective ends thereof. When the pedal 43 is depressed, the brake rod 47 is rotated by the link system such as to cause the locking fingers 48 to move a spring-loaded piston downwards (see FIG. 5) so as to move an arcuate toothed rack 50 into engagement with a toothed wheel 51 fixedly mounted on the wheel 5. The pedal 43 is also connected by a link system 46 to a labyrinth lock 52 which is a known feature of this type of cart and which holds the brake in a locked position. When the pedal is actuated to release the labyrinth lock 52, the locking fingers 48 are lifted and therewith release engagement of the rack 50 with the toothed wheel 51, via the piston 49.

Figure 4:
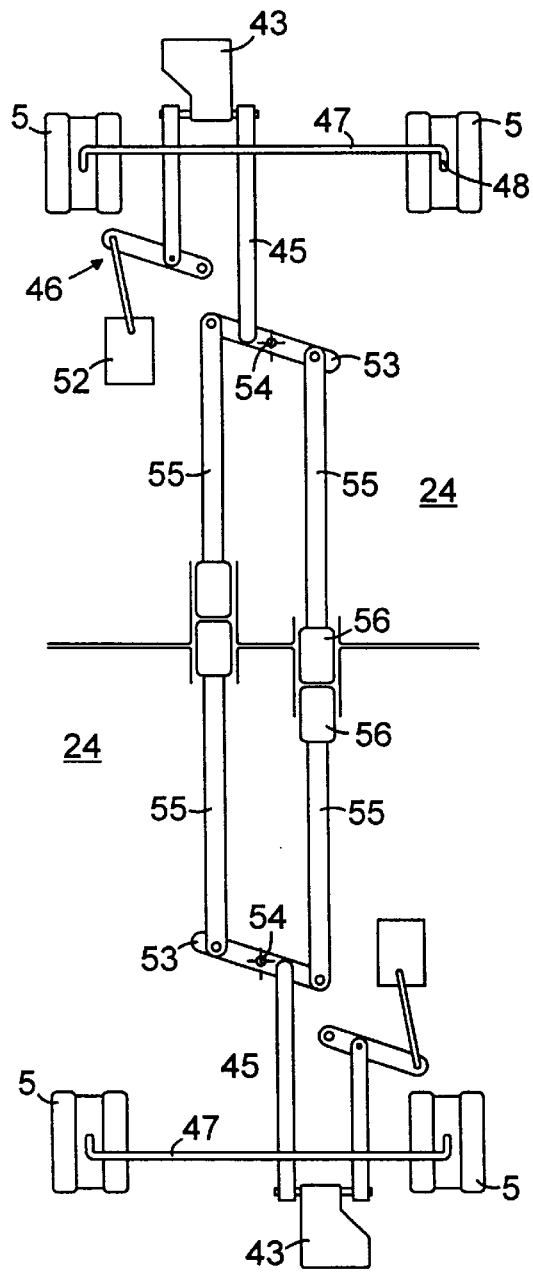
FIG. 4 illustrates the respective brake arrangements in mutual coaction when the carts are coupled together.
Figure 3:
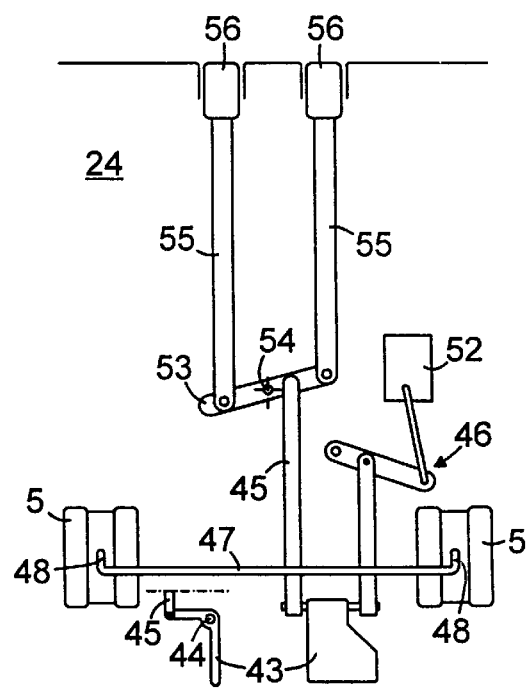
FIG. 3 illustrates schematically a brake arrangement included in respective carts.

The pedal 43 is also connected to an operating rod 45 which is pivotally connected at its free end to a two-arm lever 53. This two-arm lever 53 is pivotally mounted on the bottom part 24 by means of a pivot pin 54. As shown in FIGS. 3 and 4, a movement transmission rod 55 is mounted on each side of the pivot pin 54 and equidistantly therefrom. The free ends of the movement transmission rods carry a respective buffer 56.

FIG. 3 shows the operational state of the braking system prior to applying the cart brakes. FIG. 4 illustrates the braking systems of two mutually coupled carts, said systems being mirror images of one another. The buffers 56 of the two carts will lie close to one another or against each other. When the braking systems of the mutually coupled carts are applied from one side of the cart, assumed in FIG. 4 to be the lower side of the cart, the operating rod 45 will axially rotate the two-arm lever 53 as shown, wherewith the movement transmission rod 55 shown on the left of the Figure will press the movement transmission rod 55 of the upper cart as seen in the Figure inwards, therewith rotating the lever 53. This lever will carry out via the operating rod 45 the same locking movement as that which is carried out in response to depression of the pedal on the lower cart in the Figure, therewith locking the wheel-pair in the upper, non-attended cart as seen in the Figure. All four wheels are now locked. The components of the braking system will, of course, operate in the reverse order when releasing the brake.

Braking movement from one cart to the other can be effected with the aid of a link system other than the link system described above. A modified embodiment of the braking system is shown schematically in FIGS. 6–8.

Figure 6:
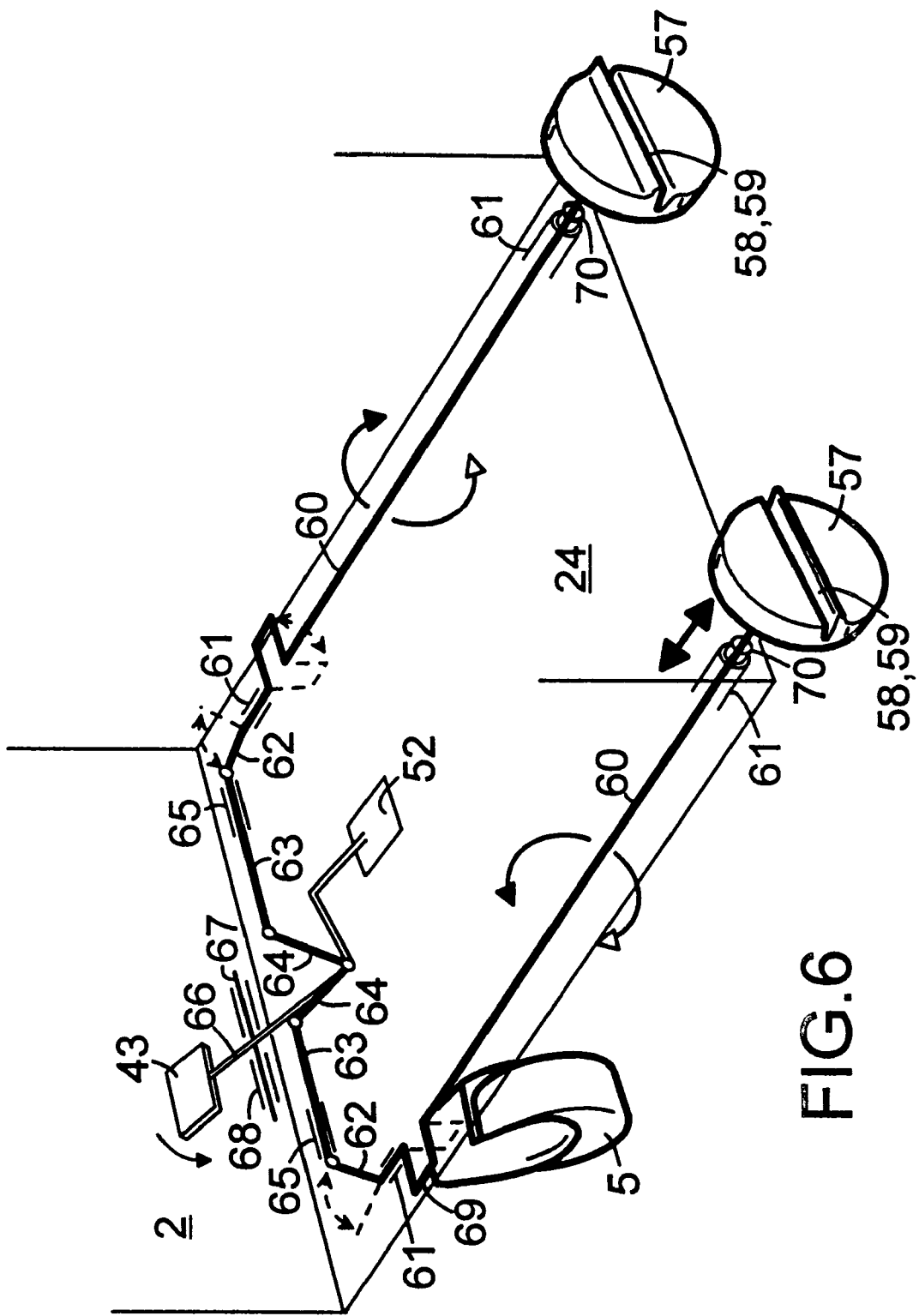
FIG. 6 illustrates another embodiment of the brake arrangement.
Figure 7:
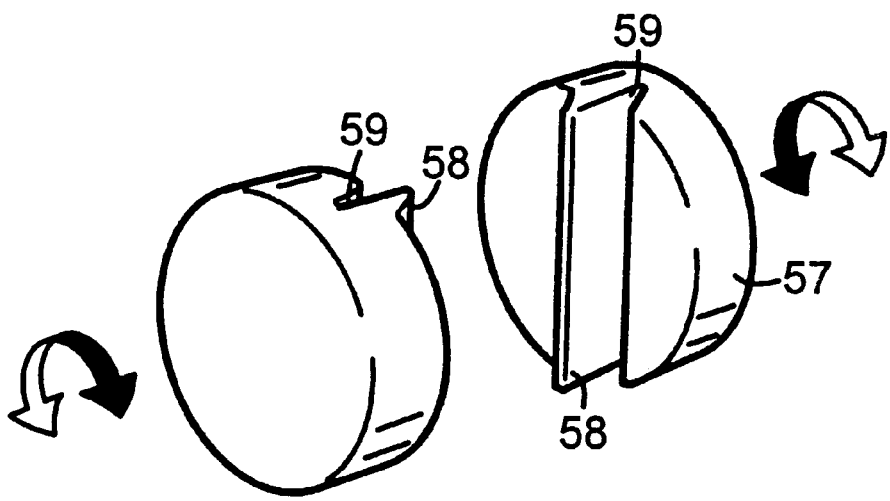
FIG. 7 illustrates schematically coupling elements included therein.

FIG. 6 is a highly schematic illustration of a catering cart with its bottom part 24 and wheels 5 (of which only one wheel is shown for the sake of clarity). In this embodiment, the axially movable buffers 56 of respective carts have been replaced with rotatable coupling elements 57 which, as shown in FIG. 7, include a cam 58 and a groove 59 provided adjacent the cam. Each coupling element 57 is non-rotatably connected to an operating rod 60 which is mounted for rotation in a bearing 61, for instance. The end of the operating rod 60 remote from the coupling element 57 is provided with a lever 62 which extends from the rod 60 at an angle of 90°. Mounted on the free end of each lever 62 is an axially movable rod 63 whose free end carries a lever 64 through the medium of a ball bearing, wherein the free end of the lever 64 is, in turn, connected to a corresponding lever 64 of the maneuvering element of the second coupling device 54 by means of a ball bearing. The axially movable rods 63 may be mounted for axial movement in schematically indicated bearings 65. When the levers 64 are brought together, a brake-pedal arm 66 is also connected by means of a ball bearing. The brake-pedal arm 66 carries the brake pedal 43 and can be swung vertically about a pivot shaft 67 which is mounted on the catering cart by means of schematically indicated bearings 68. Respective operating rods 60 include a tongue 69 which, in principle, corresponds to the locking finger 48 of the earlier described embodiment of the braking system.

Figure 5:
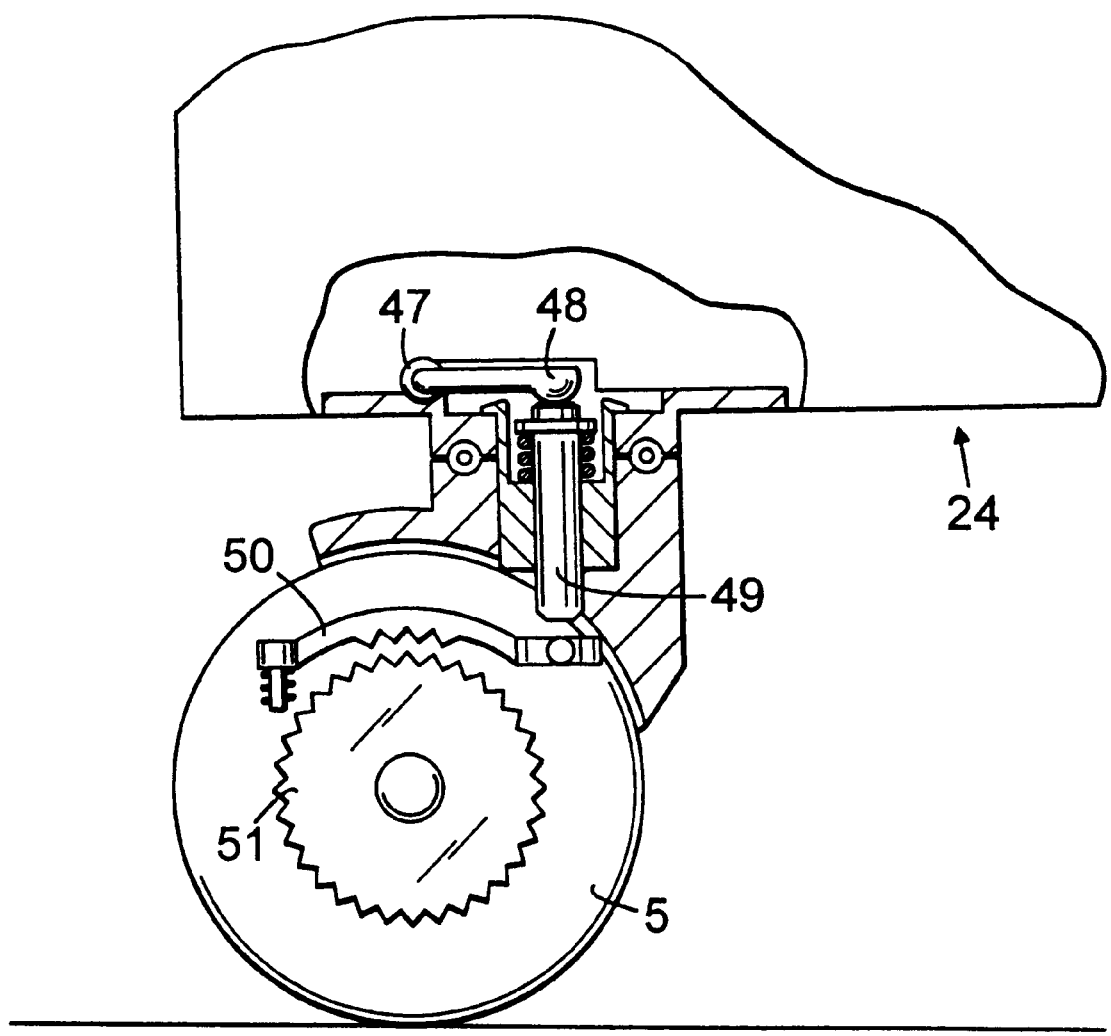
FIG. 5 is a schematic illustration of the actual wheel brake.

When the brake pedal 43 is depressed and the braking system has the operational state shown in FIG. 6, the brake-pedal arm 66 will lift the levers 64 and therewith move the rods 63 axially apart. This axial movement of the rods 63 causes the operating rods 60 to rotate in opposite directions, wherewith the tongues 69 lock the wheels via the piston 49 and the toothed rack 50 (c.f. FIG. 5) and also causes the coupling elements 57 to rotate. Similar to the embodiment described with reference to FIGS. 3 and 4, the braking system also includes labyrinth lock or so-called flip-flop mechanism 52.

Figure 8:
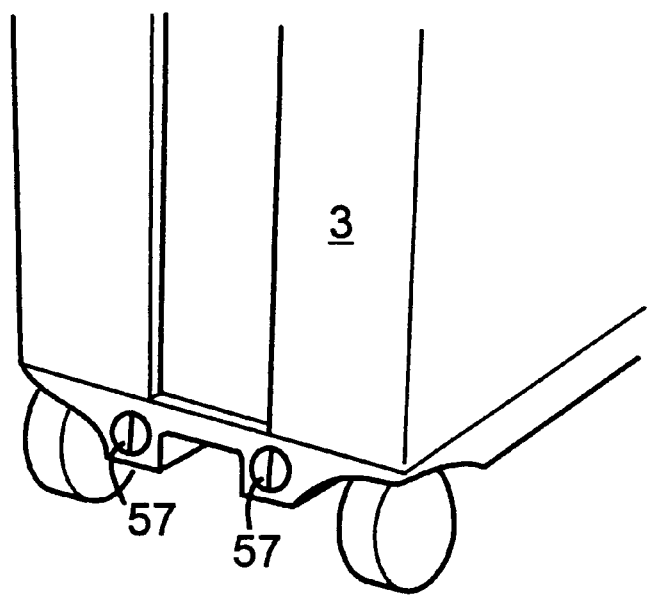
FIG. 8 illustrates positioning of the coupling elements in FIG. 7 in the catering cart.

FIG. 8 shows the coupling elements 57 mounted on the rear side 3 of the cart. FIG. 7 illustrates the manner in which two coupling elements coact when mutually coupling two catering carts, wherein the cams 58 of respective coupling elements 57 engage in the grooves 59 of respective coupling elements, therewith preventing said elements 57 from rotating in relation to one another.

When a cart whose brakes have not been applied, i.e. with cam and groove horizontal as shown in FIG. 6, is to be coupled to a cart whose brakes have been applied, with the cam and groove thus extending vertically, respective cams 58 will intersect one another. To facilitate coupling of the carts, the coupling elements 57 may be mounted resiliently, for instance with the aid of pressure springs 70, so that they can be moved inwardly against the action of the resilient force while being prevented from rotating in relation to the operating rods 60. The coupling elements 57 of the cart whose brakes have not been applied will be rotated with the aid of the pedal 43 until they snap into engagement with the coupling element of the other cart, as before described.

The cart handler can easily see whether or not the cart brakes have been applied, by observing the coupling elements on the rear side of the cart. The cart operator can easily turn the coupling elements to desired positions manually, from this side of the cart.

FIG. 6 shows the brake pedal, the brake-pedal lever 66, the operating levers 64 and the axially displaceable rods 63. The locked state of the braking system can be easily maintained by snapping or flipping over the levers 64, whereby the brake pedal need only be lifted by the toes of one foot in order to release the brake. The person skilled in this art will, of course, find many other ways of rotating the operating rods synchronously in opposite directions to achieve the purpose intended.

Naturally, lines, wires, that run over pulleys from the brake-pedal arm 66 to respective levers 62 may be used instead of the described rod system 63 and 64.

It will also be understood that the brake system need only comprise one single coupling element 57 mounted on a centre axis of the cart, although this arrangement will encroach on the space required for the cart coupling mechanism (c.f. FIG. 8—the mechanism not shown). This latter embodiment is, however, included in the concept of the invention.

What is claimed is:

1. A catering cart having a brake arrangement and a height which is substantially greater than its width and length wherein the cart is adapted for connection to another similar cart, said cart comprising four wheels, a serving side and at least one coupling element having an outwardly directed cam and a groove, and wherein at least two of said wheels can be locked with the aid of a toothed rack which can be swung into engagement with a toothed wheel, said toothed wheel being fixedly mounted on a respective wheel and which is maneuverable with the aid of a pedal, said pedal being located on said serving side of the cart, through the medium of a brake rod, wherein at least one coupling element is mounted on said side of the cart opposite to the serving side, wherein said coupling element is rotatable in a vertical plane, and an operating rod carrying said coupling element and connected to said pedal, wherein said operating rod, and therewith said coupling element, is rotated through about 90° when maneuvering the cart braking arrangement.

2. A catering cart according to claim 1, wherein two coupling elements are juxtaposed; wherein respective operating rods rotate in opposite directions in response to action of said pedal (43); and wherein said coupling elements are axially resilient.

3. A catering cart according to claim 1, wherein said operating rod is also adapted to function as a brake rod.

4. A catering cart having a brake arrangement and a height which is substantially greater than its width and length and which is intended for connection to another similar cart, said cart comprising four wheels and a serving side, and wherein at least two of the said wheels can be locked with the aid of a pivotal toothed rack which can be swung into engagement with a toothed wheel, said toothed wheel being fixedly mounted on a respective wheel, wherein said toothed rack is maneuverable by means of a pedal located on said serving side of said cart, through the medium of a brake rod, wherein said operating rod can be moved axially by said pedal when maneuvering said pedal to apply said brakes and said operating rod is connected to a two-arm lever, wherein the two-arm lever is pivotally mounted on its center to the cart and the ends of which are pivotally connected to a respective movement transmission rod having a free end which can be displaced axially by said lever, wherein said free ends of the movement transmission rods extend to the level of said side of said cart opposite the serving side, wherein when the brakes are not applied said free ends of the movement transmission rods are both located in plane with said opposite side, while one end of said movement transmission rods is displaced outwardly of and one end withdrawn inwardly of said opposite side.

5. A catering cart according to claim 4, further comprising a, buffer on said free end of each movement transmission rod (55).

6. A catering cart according to claim 4, further comprising a labyrinth lock and a link system and said toothed racks are connected to said labyrinth lock via said brake rod, said pedal and said link system.

* * * * *